United States Patent
Bailleul

(10) Patent No.: US 6,329,934 B1
(45) Date of Patent: Dec. 11, 2001

(54) MODIFYING DATA WHICH HAS BEEN CODED

(75) Inventor: Nicolas Bailleul, Paris (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/424,607

(22) PCT Filed: Mar. 30, 1999

(86) PCT No.: PCT/IB99/00547

§ 371 Date: Nov. 24, 1999

§ 102(e) Date: Nov. 24, 1999

(87) PCT Pub. No.: WO99/51036

PCT Pub. Date: Oct. 7, 1999

(30) Foreign Application Priority Data

Mar. 31, 1998 (EP) .................................................. 98400759
Apr. 3, 1998 (EP) .................................................. 98400802
Sep. 29, 1998 (EP) .................................................. 98402394

(51) Int. Cl.$^7$ .................................................. H03M 7/34
(52) U.S. Cl. .............................. 341/51; 341/59; 348/452
(58) Field of Search ........................ 341/51, 59; 348/452

(56) References Cited

U.S. PATENT DOCUMENTS

| | | | |
|---|---|---|---|
| 4,882,583 | * 11/1989 | Dimitri et al. | 341/59 |
| 5,481,310 | * 1/1996 | Hibi | 348/413 |
| 5,557,276 | * 9/1996 | Sakazawa et al. | 341/200 |
| 5,890,125 | * 3/1999 | Davis et al. | 704/501 |
| 6,181,743 | * 1/2001 | Bailleul | 375/240 |
| 6,246,438 | * 6/2001 | Nishikawa et al. | 348/401 |

FOREIGN PATENT DOCUMENTS

WO-97/47128 * 12/1997 (EP).
2316568 * 2/1998 (GB).

OTHER PUBLICATIONS

Serial No. 09/275,362.

* cited by examiner

*Primary Examiner*—Peguy JeanPierre
*Assistant Examiner*—Jean Bruner Jeanjlaude
(74) *Attorney, Agent, or Firm*—Russell Gross

(57) ABSTRACT

Data (D), which has been coded by a coder (COD) so as to obtain coded data (CD), is modified. The data (D) may be, for example, a sequence of pictures which has been coded in accordance with an MPEG standard. The data (D), which is available in a coded form, is modified in the following manner. A partial decoder (PDEC) partially decodes the coded data (CD). That is, of a series of decoding steps (Sd(1) . . . Sd(N)) which need to be carried out in order to decode the coded data (CD), the partial decoder (PDEC) carries out only a first few decoding steps (Sd(1) . . . Sd(K)), with K and N being integers and K being smaller than N. Accordingly, partially decoded data (PDD) is obtained. A data-modifier (MOD) modifies the partially decoded data (PDD). Accordingly, modified partially decoded data (MPDD) is obtained. A complementary coder (CCOD) complementary codes the modified partially decoded data (MPDD). That is, the complementary coder (CCOD) carries out one or more coding steps (Sc(K) . . . Sc(1)), each of which is a complement (C) of a specific decoding step (Sd) which has been carried out by the partial decoder (PDEC). Accordingly, coded modified data (CMD) is obtained. Since only a partial decoding is carried out, fewer circuitry will be required than if the data (D) to be modified were fully decoded. Thus, the data (D) can be modified in a cost-efficient manner.

3 Claims, 5 Drawing Sheets

| n= | · | 3 | 4 | 5 | 6 | 7 | 8 | 9 | 10 | 11 | · |
|---|---|---|---|---|---|---|---|---|---|---|---|
| CT= | · | B | B | P | B | B | P | B | B | P | · |
| α= | · | 0.9 | 0.9 | 0.8 | 0.8 | 0.8 | 0.7 | 0.7 | 0.7 | 0.6 | · |

| n= | · | 5 | 3 | 4 | 8 | 6 | 7 | 11 | 9 | 10 | · |
|---|---|---|---|---|---|---|---|---|---|---|---|
| CT= | · | P | B | B | P | B | B | P | B | B | · |
| α= | · | 0.8 | 0.9 | 0.9 | 0.7 | 0.8 | 0.8 | 0.6 | 0.7 | 0.7 | · |

MODIFYING DATA WHICH HAS BEEN CODED

FIELD OF THE INVENTION

The invention relates to modifying data which has been coded. The invention may be applied, for example, to edit a sequence of pictures which has been coded in accordance with a standard defined by the Moving Pictures Experts Group (MPEG).

BACKGROUND ART

The document ISO/IEC 13818-2 relates to the MPEG-2 standard. Section 7 describes decoding steps for deriving a sequence of pictures from a data stream. These decoding steps include, amongst others, variable-length decoding, inverse quantization, inverse discrete-cosine transformation, and motion compensation. A sequence of pictures is coded in accordance with the MPEG-2 standard if a data stream is obtained which, by applying the decoding steps described in section 7, results in a correctly decoded sequence of pictures.

SUMMARY OF THE INVENTION

It is an object of the invention to modify data which has been coded in a cost-efficient manner. The invention takes the following aspects into consideration. In principle, it is possible to fully decode the data which has been coded, to modify the data, and to code the modified data. However, in some applications, such an approach will be relatively costly. This is the case, for example, if the data to be modified is a sequence of pictures which has been coded in accordance with a video-coding standard defined by the Moving Picture Experts GCroup (MPEG). MPEG coding or MPEG decoding of video data requires, amongst other things, a relative large data storage capacity for storing pictures. What is more, a full MPEG decoding followed by a full MPEG coding, involves a further motion estimation and compensation in addition to the motion estimation and compensation which have been carried out at the coding end. This may introduce distortion.

In accordance with the invention, data which has been coded is modified in the following manner. The data which has been coded is decoded only partially. That is, only a portion of the steps which are needed to fully decode the data, is carried out. Accordingly, partially decoded data is obtained. The partially decoded data is modified. The partially decoded data which has been modified, is coded so as to obtain coded modified data. It should be noted that because, in the invention, a modification is carried out on partially decoded data, rather than on fully decoded data, some distortion may be introduced. However, in many applications, the distortion introduced will be relatively small such that, nevertheless, a satisfactory quality can be obtained at a decoding end. Since, in the invention, only a partial decoding is carried out, fewer circuitry will be required than if the data to be modified is fully decoded. Thus, the invention allows data which has been coded, to be modified in a cost-efficient manner.

It has already been mentioned that the invention may be applied to edit a sequence of pictures which has been coded in accordance with an MPEG standard. In such an application, the partial decoding may comprise variable length decoding, inverse quantization and inverse discrete cosine transformation, but not motion compensation which requires a relatively large memory. As a result, blocks of prediction-error pixels will be obtained instead of blocks of picture pixels. The blocks of prediction-error pixels may be modified, for example, by adding blocks of auxiliary pixels to the blocks of prediction-error pixels, or by scaling the prediction-error pixels, or by filtering the blocks of prediction-error pixcels, or by any combination the aforementioned operations. The coding of modified blocks of prediction-error pixels comprises discrete cosine transformation, quantization and variable-length coding, but not motion estimation which is a complex operation. Thus, motion vectors re-used. Optionally, the coding may further comprise an error compensation for reducing any errors which may be introduced by the discrete cosine transformation and the quantization of a modified block of prediction-error pixels.

The invention and additional features which may be optionally used to implement the invention to advantage, are apparent from and elucidated with reference to the drawings described hereinafter.

DETAILED DESCRIPTION OF THE DRAWINGS

First, some remarks will be made on the use of reference signs. Similar entities are denoted with an identical letter code throughout the drawings. In a single drawing, various similar entities may be shown. In that case, a numeral is added to the letter code, to distinguish similar entities from each other. The numeral will be between parentheses if the number of similar entities is a running parameter. In the description and the claims, any numeral in a reference sign may be omitted if this is appropriate.

Figure 1:
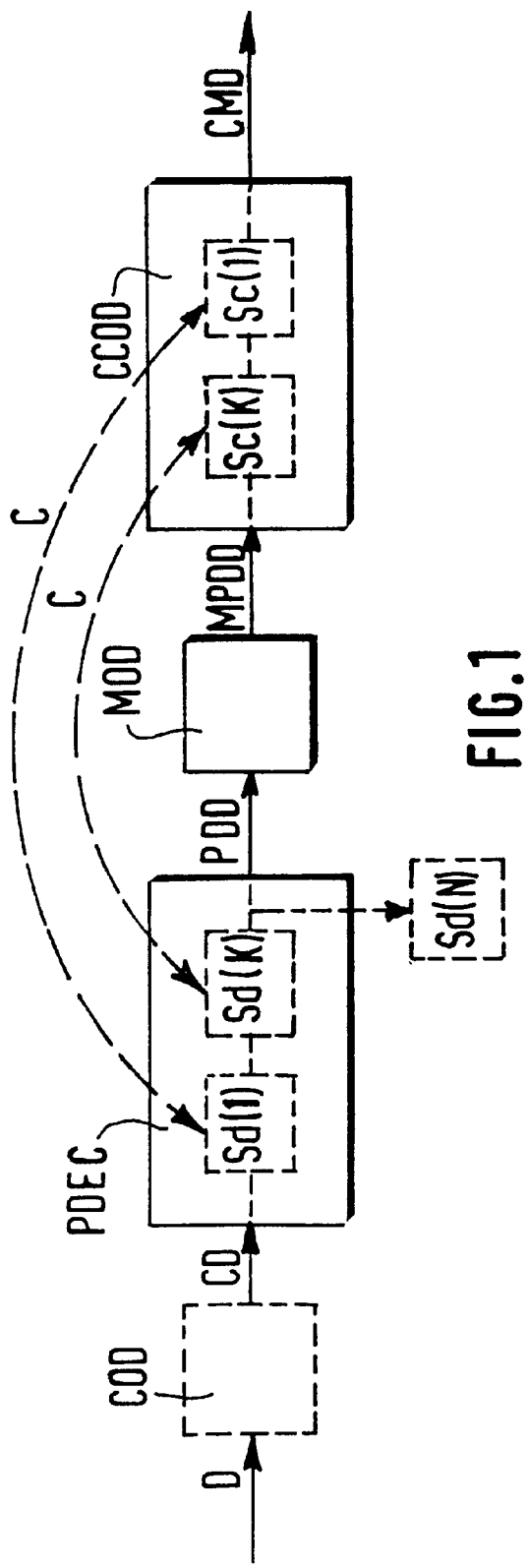
FIG. 1 is a conceptual diagram illustrating basic features of the invention as claimed in claim 1.

FIG. 1 illustrates basic features of the invention in full lines. Data D, which has been coded by a coder COD so as to obtain coded data CD, is modified in the following manner. A partial decoder PDEC partially decodes the coded data CD. That is, of a series of decoding steps Sd(1) . . . Sd(N) which need to be carried out in order to decode the coded data CD, the partial decoder PDEC carries out only a first few decoding steps Sd(1) . . . Sd(K), with K and N being integers and K being smaller than N. Accordingly, partially decoded data PDD is obtained. A data-modifier MOD modifies the partially decoded data PDD. Accordingly, modified partially decoded data MPDD is obtained. A complementary coder CCOD complementary codes the modified partially decoded data MPDD. That is, the complementary coder CCOD carries out one or more coding steps Sc(K) . . . Sc(1), each of which is a complement C of a specific decoding step Sd which has been carried out by the partial decoder PDEC. Accordingly, coded modified data CMD is obtained.

The following aspects have been taken into consideration with regard to the basic features illustrated in FIG. 1. Since a modification is carried out on the partially decoded data PDD rather than on fully decoded data, some distortion may be introduced. Whether or not the distortion is noticeable not only depends on the modification which is carried out, but also depends, amongst other things, on what the coded data CD represents and on how the data has been coded. For example, if the coded data CD represents a sequence of pictures, distortion of low-frequency information will be more noticeable than distortion of high-frequency information.

Figure 2:
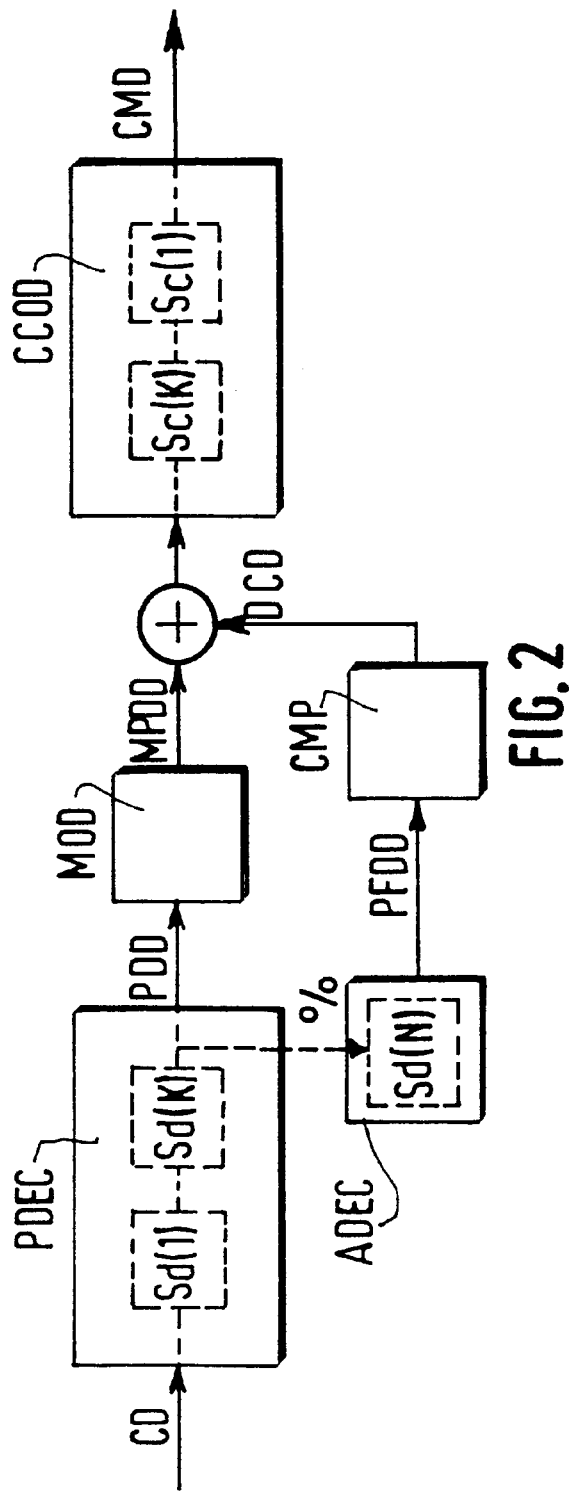
FIG. 2 is a conceptual diagram illustrating additional features as claimed in 2.

FIG. 2 illustrates the following features in addition to the features illustrated in FIG. 1. An auxiliary decoder ADEC fully decodes only a portion % of the coded data CD. That is, the auxiliary decoder ADEC, in combination with the partial decoder PDEC, carries out the complete series of decoding steps for the portion % of the coded data CD. Accordingly, a piece of fully decoded data PFDD is obtained. A distortion compensator CMP derives distortion-compensating data DCD from the piece of fully decoded data PFDD. An adder ADD adds the distortion-compensating data DCD to the modified partially decoded data MPDD. The complementary coder CCOD complementary codes the modified partially decoded data MPDD with the distortion-compensating data DCD added thereto. Accordingly, the coded modified data CMD is obtained.

Figure 3:
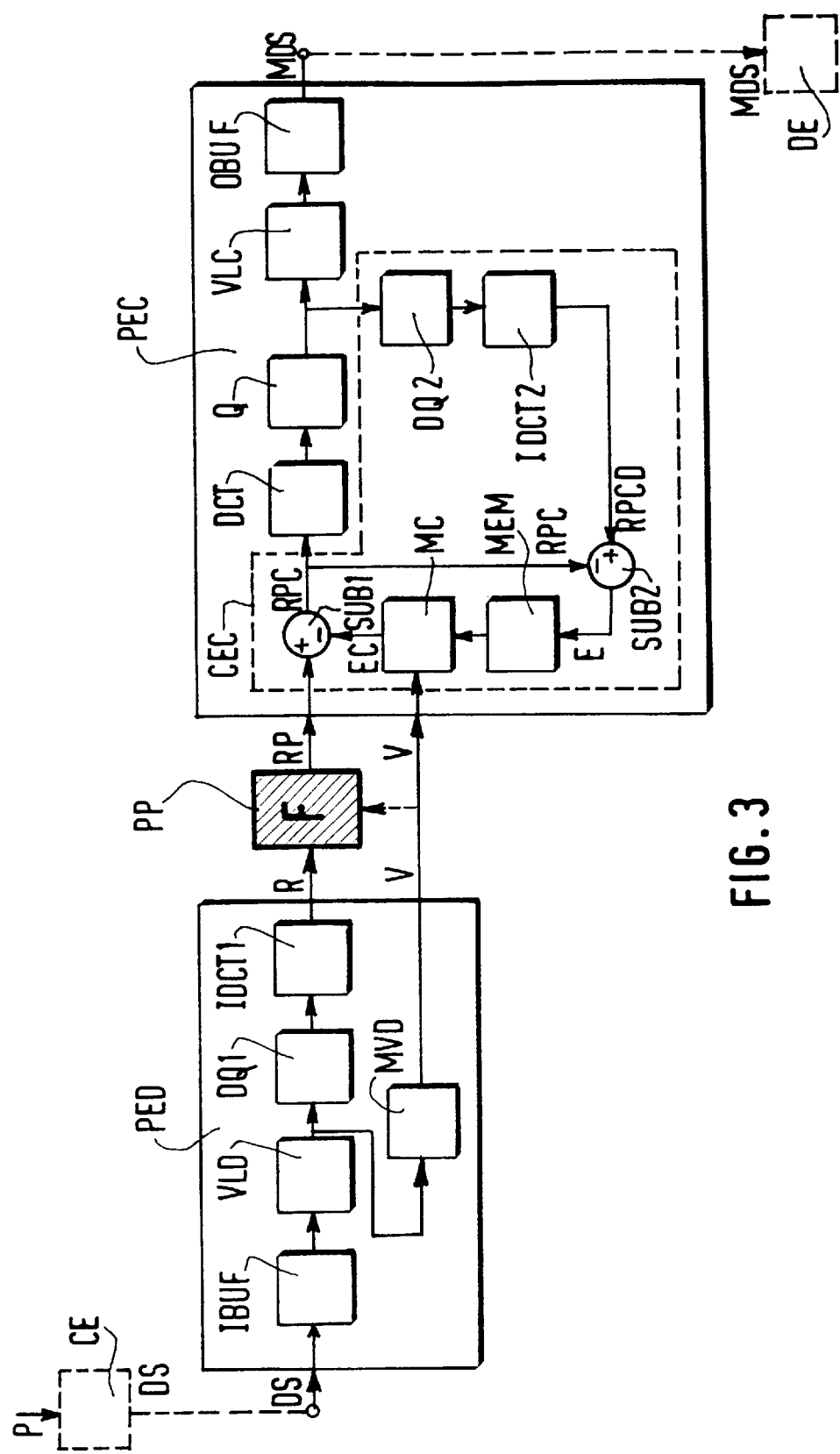
FIG. 3 is a block diagram of an MPEG-video modifier in accordance with the invention.

The features illustrated in FIG. 2 provide the following advantageous affects. The auxiliary decoder ADEC allows to fully decode a portion of the coded data CD which is critical in terms of distortion. For example, if the coded data represents a sequence of pictures, the auxiliary decoder ADEC may fully decode a low-frequency portion of the coded data CD. Since the thus obtained piece of fully decoded data PFDD is used to compensate for distortion, a satisfactory quality can be obtained at a decoding end which, in some applications, would not be possible if no distortion compensation were applied. It should be noted that a satisfactory quality can be achieved by fully decoding the coded data CD in its entirety which, however, is generally more expensive then fully decoding a portion of the coded data CD only. Thus, the features illustrated in FIG. 2 allow a cost-efficient manner of data modification with FIG. 3 shows a basic example of an MPEG-video modifier which recaptures the characteristics illustrated in FIG. 1. The MPEG-video modifier may be used for carrying out a picture processing between a coding end CE and a decoding end DE, both illustrated in broken lines. The coding end CE codes a sequence of pictures P in accordance with an MPEG standard. As a result, an MPEG data stream DS is obtained. The MPEG-video modifier provides a modified MPEG data-stream MDS in response to the data stream DS. The decoding end DE which receives the modified MPEG data-stream MDS will not reproduce the sequence of pictures P but rather a modified version thereof. Thus, in effect, the MPEG-video modifier modifies video data formed by sequence of pictures P.

The MPEG-video modifier shown in FIG. 3 comprises the following main functional blocks: a prediction-error decoder PED, a picture processor PP and a prediction-error coder PEC. The prediction-error decoder PED comprises an input buffer IBUF, a variable-length decoder VLD, de-quantizer DQ1 and an inverse discrete cosine transformer IDCT1. The prediction-error decoder DEC also comprises a motion-vector decoder MVD. The prediction-error coder PEC comprises a coding-error compensator CEC, a discrete-cosine transformer DCT, a quantizer Q, a variable-length coder VLC and an output buffer OBUF. The coding-error compensator CEC comprises a subtractor SUB1, a de-quantizer DQ2, an inverse discrete cosine transformer IDCT2, a subtractor SUB2, a memory MEM, and a motion compensator MC.

The MPEG-video modifier illustrated in FIG. 3 basically operates as follows. The prediction-error decoder PED derives blocks of prediction-error pixels R from the MPEG data stream DS received. The prediction-error decoder PED also provides motion vectors V which are comprised in the MPEG data stream DS in a coded form. Each motion vector V is associated to a specific block of prediction-error pixels R. The picture processor PP carries out a certain picture-processing function F on the blocks of prediction-error pixels R. Accordingly, processed blocks of prediction-error pixels RP are obtained. The prediction-error coder PEC codes the processed blocks of prediction-error pixels RP. To that end it uses the motion vectors V. As a result, the modified MPEG data stream MDS is obtained.

The prediction-error coder PEC will now be discussed in greater detail. The coding-error compensator CEC subtracts a coding-error compensating block of pixels EC from a processed block of prediction-error pixels RP. Accordingly, a coding-error compensated processed block of prediction-error pixels RPC is obtained. The discrete-cosine transformer DCT transforms the coding-error compensated processed block of prediction-error pixels RPC into a block of spatial-frequency coeffients. The quantizer Q quantizes each spatial-frequency coefficient in the block. As a result, a block of quantized spatial-frequency coefficients is obtained which is supplied the variable-length coder VLC. In response, the variable-length coder VLC provides variable-length codes which are written into the output buffer OBUF and, after a certain time, are read from the output buffer OBUF so as to form part of the modified MPEG data stream MDS.

The coding-error compensator CEC establishes error-compensating, blocks of pixels EC in the following manner. For each coding-error compensated processed block of prediction-error pixels RPC, the inverse discrete cosine transformer IDCT2 preceded by the de-quantifier DQ2, provides a decoded version RPCD of the coding-error compensated processed block of prediction-error pixels RPC. The subtractor SUB1 subtracts the original coding-error compensated processed block of prediction-error pixels RPC from the decoded version RPCD thereof. As a result, a coding-error block of pixels E is obtained which is stored in the memory MEM. Thus, when the prediction-error coder PEC receives a processed block of prediction-error pixels RP belonging to a picture P(n), the memory MEM will contain coding-error blocks of pixels E belonging to the previous picture P(n−1). The motion compensator MC selects one of these coding-error blocks of pixels E on the basis of a motion vector V associated to the processed block of prediction-error pixels RP. The coding-error block of pixels E which has been selected constitutes the error-compensating block of pixels EC.

The MPEG-video modifier illustrated in FIG. 3 may affect the picture quality to some extent. This is due to the fact that, in the MPEG-video modifier illustrated in FIG. 3, picture processing is carried out on prediction-error pixels instead of on picture pixels. A block of picture pixels can be obtained by adding to a block of prediction-error pixels R, a motion compensated block of picture pixels belonging to a previous image. The MPEG-video modifier illustrated in FIG. 3 will provide a picture quality similar to that of an MPEG video modifier which processes picture pixels, if the following condition is satisfied. The sum of the results obtained by applying the picture-processing function F to the block of prediction-error pixels R and to the motion compensated block of picture pixels, respectively, is equal to the result obtained by applying the picture-processing function F to the sum of the block of prediction-error pixels R and the motion-compensated block of picture pixels.

The MPEG-video modifier illustrated in FIG. 3 may be used, for example, to carry out a cross fade between a first sequence of pictures represented by the MPEG-coded data stream DS, and a second sequence of pictures. Ideally, the modified MPEG-coded data stream MDS should then represents a cross-faded sequence of pictures having the following property:

$$PCF(n)=\alpha(n)\times P1(n)+(1-\alpha)\times P2(n)$$

With PCF being a picture from the cross-faded sequence of pictures, P1 being a picture from the first sequence of pictures PS1, P2 being a picture from the second sequence of pictures PS2, α being a fade coefficient which gradually decreases from 1 to 0 in a step-wise manner or vice versa, and n being an integer indicating a picture number of a sequence. The fade coefficient α is constant throughout a picture, but may vary from one picture to an other.

Figures 4A, 4B, 5:
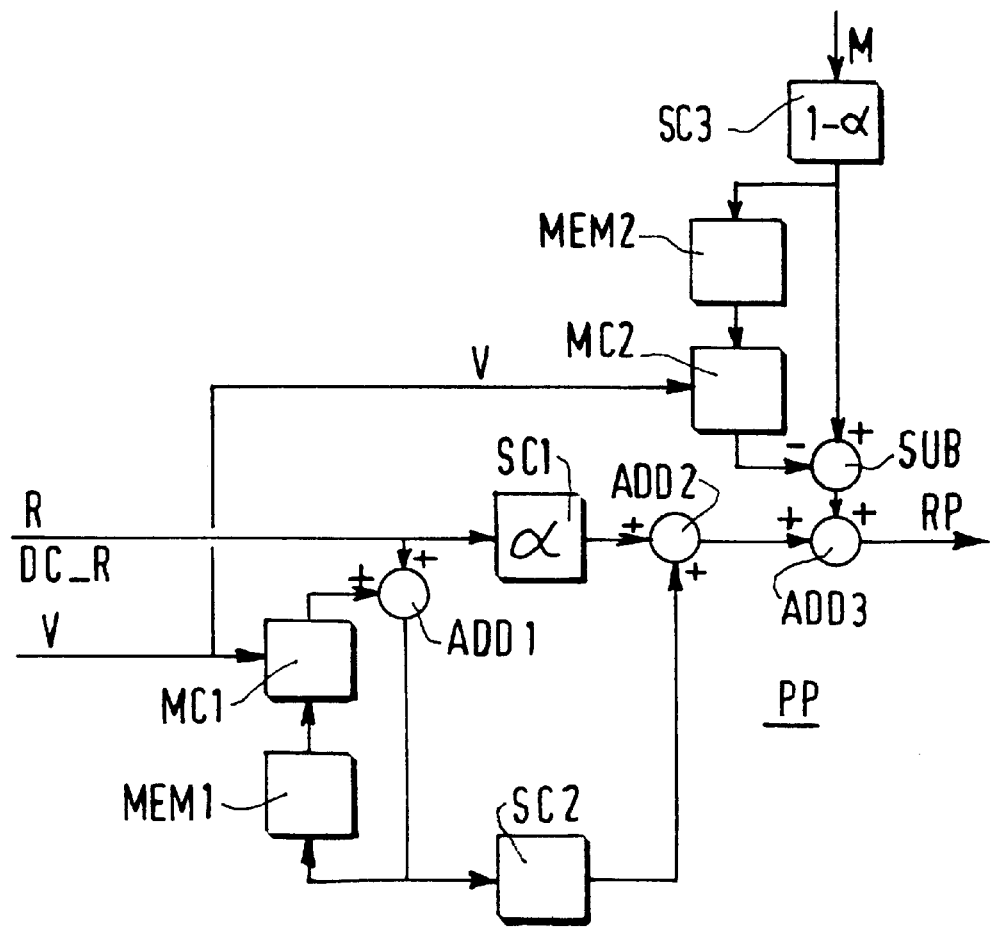
FIGS. 4a and 4b are tables illustrating a series of fade coefficients a for carrying out a cross-fade between two different sequences of pictures.
FIG. 5 is a block diagram of a picture processor which, when applied in the MPEG-video modifier illustrated in FIG. 3, allows a cross-fade to be carried out between two different sequences of pictures.

FIG. 4a and 4b illustrate fade coefficients α for a series of pictures, each picture having a different picture number n. The only difference between FIG. 4a and 4b is that, in FIG. 4a, the picture number n is in the order in which the pictures are displayed whereas, in FIG. 4b, the picture number n is in the order in which the pictures are coded. Below each picture number n=3..11, in the middle row titled CT, is a letter B or P. The letter B or P indicates that the picture has been B-type or P-type coded, respectively, in accordance with the MPEG standard. The order in which the pictures are coded depends on the type of coding used. FIG. 4b shows that a picture of the B-type is always preceded by a picture which of the P-type having a higher picture number n.

FIG. 5 illustrates a picture processor PP which, when applied in the MPEG-video modifier illustrated in FIG. 3, allows a cross-fade to be carried out between a first and a second sequence of pictures. The blocks of prediction-error pixels R and the motion vectors V which the picture processor PP receives from the partial decoder PDEC shown in FIG. 3, represent the first sequence of pictures. In addition to each block of prediction-error pixels R, the picture processor also receives a DC coefficient DC_R. The DC coefficient DC_R originates from the block of spatial-frequency coefficients from which the inverse discrete cosine transformer IDCT1, illustrated in FIG. 3, derives the block of prediction-error pixels R. The picture processor PP further receives blocks of picture pixels M belonging to the second sequence of pictures. The picture processor PP comprises the following elements: three scaling functions SC1, SC2, and SC3, two memories MEM1 and MEM2, two motion compensators MC1 and MC2, three adders ADD1, ADD2 and ADD3, and a subtractor SUB.

The picture processor PP illustrated in FIG. 5 operates as follows. For a block of prediction-error pixels R belonging to a picture P, the scaling function SC1 multiplies each prediction-error pixel with the fade coefficient α applying to the picture P. Accordingly, the scaling function SC1 provides blocks of scaled prediction-error pixels.

Due to the fact that, for the purpose of cross fading, prediction-error pixels are processor has to carry out the cross fade illustrated in FIGS. 4a and 4b. Let it further be assumed that the scaling function SC1 receives a block of prediction-error pixels R belonging to the picture number 8 which is a P-type coded picture. This block of prediction-error pixels is a difference B(P8)–B(P5) between a block of pixels B(P8) belonging to picture number 8, and a block of pixels B(P5) belonging to picture number 5. According to the cross fade illustrated in FIGS. 4a and 4b, the pixels in the block B(P8) belonging to picture number 8 are to be multiplied by α=0.7, and the pixels in the block B(P5) belonging to picture number 5 are to be multiplied by α=0.8. However, since in the picture processor illustrated in FIG. 5 these pixels are not available as such, but only in a differential form, they can not be scaled individually. As a result, some error is introduced. For example, if the scaling function SC1 applies cross-fade coefficient α=0.7 for the block of prediction-error pixels R being the difference B(P5)–B(P5), it will provide a scaled difference 0.7×B(P8)–0.7×B(P5) whereas it should provide 0.7×B(P8)–0.8×B(P5).

To compensate the error described hereinbefore, the picture processor illustrated in FIG. 5 comprises an auxiliary decoder formed by the adder ADD1, the motion compensator MC1 and the memory MEM1. The auxiliary decoder provides, on the basis of successive DC coefficients DC_R, so-called DC approximations of blocks of picture pixels which would be obtained if the necessary decoding steps were carried out on the blocks of prediction-error pixels R.

A DC approximation is obtained in the following manner. The memory MEM1 contains previous DC approximations belonging to a previous picture which, at the coding end, has served as a reference for establishing the block of prediction-error pixels R concerned. Each previous DC approximation is associated to a different block of pixels in the previous picture. The motion compensator MC1 uses the previous DC approximations to provide a prediction for the DC approximation on the basis of the motion vector V. The adder ADD1 adds the prediction for the DC approximation to the DC coefficient DC_R associated to the block of prediction-error pixels R. The result of this addition is stored in the memory MEM1 and constitutes the DC approximation which will be used for error compensation. In effect, the adder ADD1, the motion compensator MC1 and the memory MEM1, which constitute the auxiliary decoder, in combination with the partial decoder PEC illustrated in FIG. 3, form a low-resolution MPEG-video decoder. This low-resolution MPEG video decoder fully decodes the MPEG video data stream DS using only the portion formed by the DC coefficients of the blocks of spatial-frequency coefficients.

The scaling function SC2 reads from the memory MEM 1 the DC approximation which is to be used for error compensation, and multiplies the DC approximation with an appropriate error-compensation coefficient. The thus scaled DC approximation forms a block of error-compensating pixels. The adder ADD2 adds the block of error-compensating pixels to the block of scaled prediction-error pixels provided by the scaling function SC1. Accordingly, the adder ADD2 provides an error-compensated block of scaled prediction-error pixels.

The following is an example of the error compensation described hereinbefore. Let it be assumed that the scaling function SC1 provides the block of scaled prediction-error pixels being the scaled difference 0.7×B(P8)−0.7×B(P5) discussed hereinbefore. The scaling function SC2 reads from the memory MEM1 a DC approximation DC_B(P5) of the block B(P5). The DC approximation DC_B(P5) has been established earlier on the basis of a DC coefficient DC_R belonging to picture number 5. The scaling function SC2 multiplies the DC approximation by −0.1 so as to form a block of error-compensating pixels −0.1×DC_B(P5) which the adder ADD2 adds to the block of scaled prediction-error pixels being the scaled difference 0.7×B(P8)−0.7×B(P5). Accordingly, the adder ADD2 provides the following error-compensated block of scaled prediction-error pixels: 0.7×B(P8)−0.7×B(P5)−0.1×DC_B(P5). The latter is an approximation of what ideally should have been obtained: 0.7×B(P8)−0.8×B(P5).

As mentioned hereinbefore, the picture processor PP receives blocks of picture pixels M belonging to the second sequence of pictures which is to be cross-faded with the first sequence of pictures represented by the blocks of prediction-error pixels R. The scaling function SC3 multiplies each picture pixel with a complementary fade coefficient 1−α. Accordingly, the scaling function SC3 provides blocks of scaled picture pixels.

The memory MEM2, the motion compensator MC2 and the subtractor SUB form an insertion-adaptation path which processes the blocks of scaled picture pixels. The blocks of scaled picture pixels are written into the memory MEM2 such that when a certain picture of the second sequence is processed, the memory MEM2 contains a faded version of the previous picture. The motion compensator MC2 selects, on the basis of the motion vector V, a reference block of scaled picture pixels from the faded version of the previous picture stored in the memory MEM2. The subtractor SUB subtracts the reference block of scaled picture pixels from the block of scaled picture pixels provided by the scaling function SC2. Accordingly, the subtractor SUB provides an insertion-adapted block of scaled picture pixels. It is noted that applicant's co-pending patent application 09/400960 describes an insertion-adaptation path for processing video which is to be added to partially decoded MPEG video.

The adder ADD3 adds an insertion-adapted block of scaled picture pixels to the error-compensated block of scaled prediction-error pixels provided by the adder ADD2. Accordingly, the adder ADD3 provides a cross-faded block of pixels RP. The prediction-error coder PEC illustrated in FIG. 3, codes the cross-faded block of pixels RP. Accordingly, the modified MPEG data stream MDS represents the cross-fade between the first sequence of pictures, which is represented by the MPEG-video stream DS, and the second sequence of pictures which is supplied to the picture processor illustrated in FIG. 5.

Figure 6:
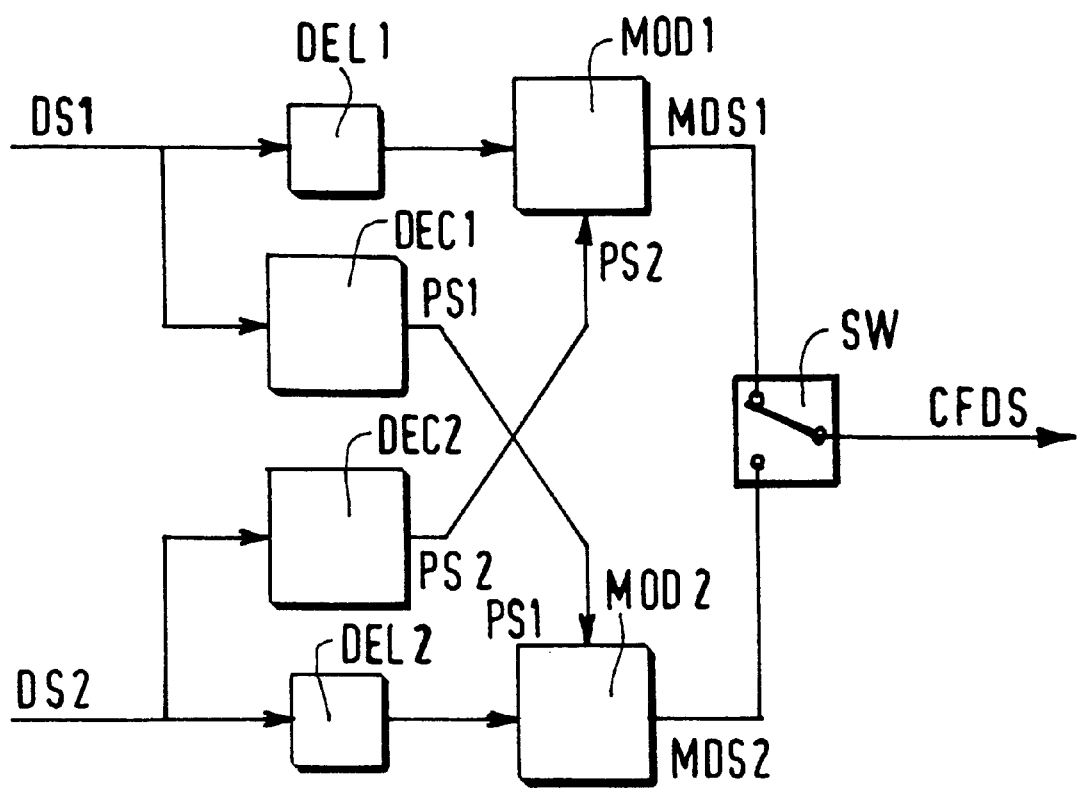
FIG. 6 is a block diagram of an MPEG cross-fading assembly in accordance with the invention.

FIG. 6 illustrates an MPEG-video cross-fading assembly. The MPEG-video cross-fading assembly carries out a cross fade between a first sequence of pictures represented by a first MPEG data stream DS1, and a second sequence of pictures represented by a second MPEG data stream DS2. Accordingly, a cross-faded MPEG data stream CFDS is obtained which represents a cross-fade between the two picture sequences. The MPEG cross-fading assembly comprises two delay circuits DEL1, DEL2, two decoders DEC1, DEC2, two MPEG-video modifiers MOD1, MOD2, and a switch SW. Each of the two MPEG video modifiers MOD1, MOD2 is similar to the MPEG video modifier shown in FIG. 3 comprising the picture processor PP illustrated in FIG. 5.

The MPEG-video modifier illustrated in FIG. 6 operated as follows. The delay circuits DEL1, DEL2 delay the first and the second MPEG data streams DS1, DS2, respectively, to compensate for delays in the decoders DEC1, DEC2. Decoder DEC1 provides a fully decoded first sequence of pictures PS1 and decoder DEC2 provides a fully decoded second sequence of pictures PS2. MPEG-video modifier MOD1 carries out a cross-fade between the first sequence of pictures represented by the first MPEG data stream DS1 and the fully decoded second sequence of pictures PS2. MPEG-video modifier MOD2 carries out a complementary cross-fade between the fully decoded first sequence of pictures PS2 and the second sequence of pictures represented by the second MPEG data stream DS2. That is, the sum of the fade coefficients used in the MPEG-video modifiers MOD1, MOD2 is 1. For example, when the MPEG-video modifier MOD1 applies the fade-coefficient α1=0.9, the MPEG-video modifier MOD2 applies the fade-coefficient α2=0.1.

Thus, each MPEG-video modifier MOD1, MOD2 provides a modified MPEG-video data steam MDS1, MDS2, respectively, which, in principle, represents the same cross-faded sequence of pictures. If the fade coefficient α1 applied by the MPEG-video modifier MOD1 is greater than 0.5, the switch SW selects the modified MPEG data stream MDS1 to constitute the cross-faded data stream CFDS. Conversely, if the fade coefficient α2 applied by the MPEG-video modifier MOD2 is greater than 0.5, the switch SW selects the modified MPEG data stream MDS2 to constitute the cross-faded data stream CFDS.

The reason for switching between the modified data streams MDS1 and MDS2 as described hereinbefore, is as follows. Referring to the picture processor illustrated in FIG. 5, the insertion-adaptation path formed by the memory MEM2, the motion compensator MC2, and the subtractor SUB, processes video information on the basis of motion vectors V which do not belong to that video information. This may distort the video information to some extent. If the fade coefficient α is relatively high, which implies that 1−α is relatively low, the somewhat distorted video information will contribute to the cross-faded sequence of pictures to a relatively small extent only. However, if the fade coefficient α is relatively low, which implies that 1−α is relatively high, the somewhat distorted video information will significantly contribute to the cross-faded sequence of pictures. The switch SW selects the modified data stream MDS1 or MDS2 which has been obtained with the greater fade coefficient α. Thus, the switch selects the modified data stream MDS1 or MDS2 which has the better picture quality, to constitute the cross-faded MPEG data stream CFDS.

Figure 7A:
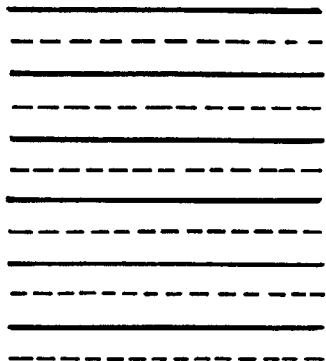
FIGS. 7a and 7b are conceptual diagrams illustrating an interlaced picture having a 422 chrominance format and a 420 chrominance format, respectively.
Figure 7B:
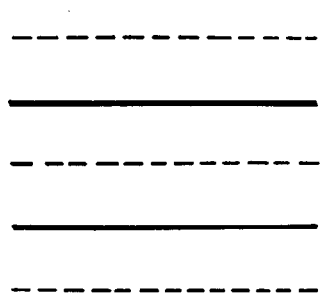

FIG. 7a illustrates an interlaced picture in a 422 chrominance format as defined in the MPEG-2 standard. FIG. 7b illustrates an interlaced picture in a 420 chrominance format. In FIGS. 7a and 7b, a full line represents chrominance pixels belonging to an odd line of a picture, and a broken line represents chrominance pixels belonging to an even line. In the 422 chrominance format, there are twice as many chrominance pixels in the vertical direction as in the 420 chrominance format.

Figure 8:
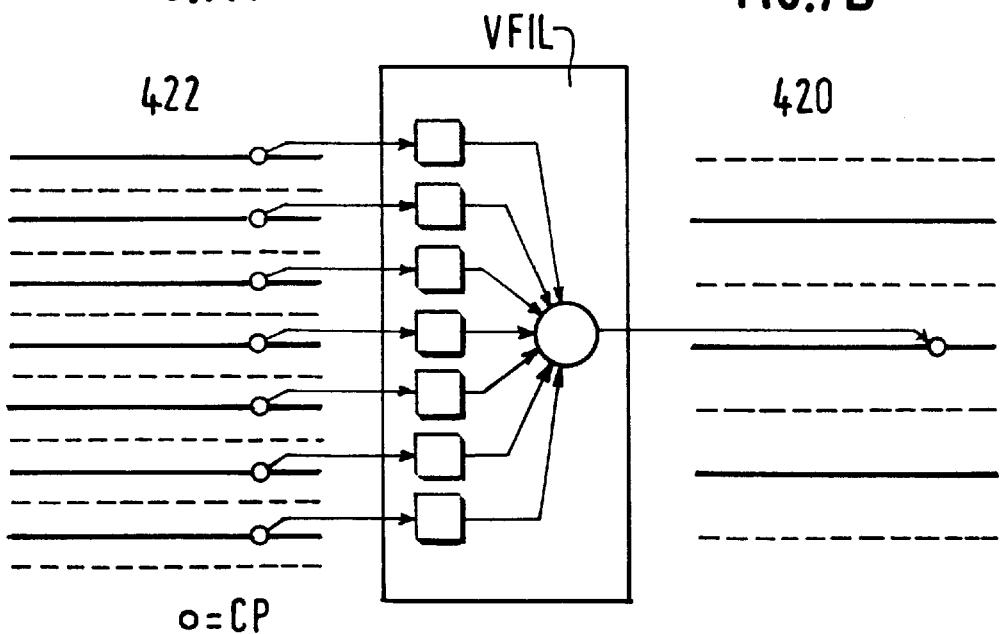
FIG. 8 is a conceptual diagram illustrating a conversion from the 422 chrominance format into the 420 chrominance format.

FIG. 8 illustrates a conversion of an interlaced picture in the 422 chrominance format into an interlaced picture in the 420 chrominance format, which conversion will be referred to as a 422/420 conversion hereinafter. In FIG. 8, a chrominance pixel CP is represented by a small circle. In the 422/420 conversion illustrated in FIG. 8, a vertical filter VFIL provides a chrominance pixel for the 420 chrominance format by making a weighed combination of the best corresponding chrominance pixel in the 422 format and other chrominance pixels. These other chrominance pixels have the same horizontal position as the best corresponding chrominance pixel, but belong to neighboring lines having the same parity as the line to which the best corresponding chrominance pixel belongs.

Figure 9:
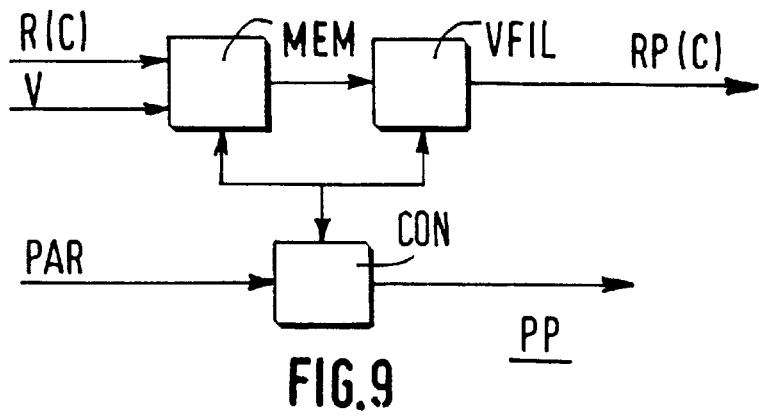
FIG. 9 is a block diagram illustrating a picture processor which, when applied in the MPEG-video modifier illustrated in FIG. 3, allows a conversion to be carried out from the 422 chrominance format into the 420 chrominance format.

FIG. 9 illustrates a picture processor PP which can be applied in the FIG.3 MPEG-video modifier to carry out a 422/420 conversion. The picture processor PP receives from the partial decoder illustrated in FIG. 3, blocks of prediction-error chrominance pixels R(C) and the motion vectors V associated thereto. With each block of prediction-error chrominance pixels R(C), the picture processor also receives coding parameters PAR which are included in the MPEG data stream. The coding parameters PAR indicate how the block of prediction-error chrominance pixels R(C) has been obtained at the coding end. The picture processor comprises the following elements: a memory MEM, a vertical filter VFIL and a conversion controller CON.

The picture processor operates in the following manner. The blocks of prediction-error chrominance pixels R(C) and the motion vectors V are written into the memory MEM such that the vertical filter VFIL is able to gather prediction-error chrominance pixels from different blocks which are each other's neighbors in the vertical direction, as well as the motion vectors belonging to these blocks. For a certain prediction-error chrominance pixel, the conversion controller CON checks if the block to which the prediction-error chrominance pixel belongs, and the blocks which are upper neighbor and lower neighbor, respectively, have similar motion vectors V. If this is the case, the vertical filter VIGIL uses these blocks to provide a prediction-error chrominance pixel for the 420 format. If not, the vertical filter VFIL uses the block to which the prediction-error chrominance pixel belongs only and, in effect, mirrors this block to simulate an upper neighbor and a lower neighbor providing filter input data.

The conversion controller CON verifies, on the basis of the coding parameters PAR and the motion vector V, if the following three conditions apply. Firstly, a frame-type prediction mode has been used to establish the block of prediction-error chrominance pixels R(C) concerned. Secondly, the motion vector V is expressed in full pixel units or, when it is expressed in half pixel units, its vertical component has an even value. Thirdly, the parity of the motion's vector vertical component changes when divided by 2. If these three conditions apply, the conversion controller CON changes the frame-type prediction mode into a field-type prediction mode. To that end, it calculates a binary value for a flag motion_vertical_field_select included in the modified MPEG data stream MDS. At a decoding end, this flag selects either a field comprising even lines or a field comprising uneven lines for carrying out a motion compensation. The binary value for the flag motion_vertical_field_select is such that, in the 422/420 conversion, line parity is preserved. That is, it ensures that if, for a prediction-error chrominance pixel on a line in an interlaced picture, the motion vector V refers to a chrominance pixel on an other line in another interlaced picture, the line which is referred to has the same parity in the 422 chrominance format and in the 420 chrominance format.

There are numerous ways of physically spreading functions or functional elements over various units. In this respect, the drawings are very diagrammatic, each representing only one possible embodiment of the invention. Thus, although a drawing shows different functional elements as different blocks, this no by means excludes that some functional elements, or all functional elements, may be implemented as a single physical unit.

Although, in FIG. 2, the auxiliary decoder ADEC fully decodes a portion % of the coded data CD in combination with the partial decoder PDEC, it is also possible for the auxiliary decoder ADEC to fully decode a portion % of the coded data CD by itself. In that case, the auxiliary decoder ADEC will carry out all the decoding steps Sd(1) . . . Sd(N) for a portion of the coded data CD only, rather than applying the missing decoding steps to the partially decoded data PDD as illustrated in FIG. 2.

Although, in FIG. 6, the decoders DEC and the MPEG video-modifiers MOD are shown as separate blocks, they may share one or more circuits and functions. As mentioned hereinbefore, each MPEG video-modifier MOD comprises a picture processor PP similar to the picture processor illustrated in FIG. 5. The latter comprises an auxiliary decoder formed by the adder ADD1, the motion compensator MC1 and the memory MEM1. These elements may be shared with the decoder DEC receiving the same data stream DS as the MPEG-video modifier MOD concerned. For example, the adder ADD2 in the picture processor PP illustrated in FIG. 5 may receive error-compensating block of pixels which are derived from the decoded sequence of pictures PS1 or PS2. Since, in that case, the error-compensating blocks of pixels are derived from a fully decoded picture rather than a DC approximation thereof, it is possible fully compensate any error in the block of scaled prediction-error pixels provided by the adder ADD1.

With respect to the picture processor PP illustrated in FIG. 5, the following should be noted. It is possible to modify the picture processor PP such that it is suitable for inserting video data into an MPEG data stream. The video data to be inserted in the MPEG data stream may be, for example, a logo. In such a modification of the picture processor PP illustrated in FIG. 5, the blocks of prediction-error pixels R belong to the MPEG data stream in which video data needs to be inserted. The blocks of picture pixels M belong to the video data to be inserted. If the video data to be inserted is a logo, there will be relatively many blocks of picture pixels M with zero pixels only, because the logo will only occupy a relatively small portion of a full picture.

The following modifications make the picture processor PP illustrated in FIG. 5 suitable for video insertion. The adder ADD1, the motion compensator MC1, the memory MEM1 and the scaling function SC2 are removed. The scaling functions SC1 and the adder ADD2 are replaced by short circuits. The scaling function SC3 may also be replaced by a short circuit but, preferably, it is replaced by a processing arrangement for processing the video to be inserted. This processing may include a calculation of average pixel values belonging MPEG data stream and a correction of the video to be inserted on the basis of these average pixels values. Such processing takes into account, as it were, what will happen with the processed blocks of prediction error pixels RP at a decoding end. Accordingly, a satisfactory approximation be achieved of a video insertion in which the MPEG data stream is fully decoded. The international application PCT/IB99/00235 incorporated by reference herein, describes processing of video to be inserted which allows such a satisfactory approximation.

With regard to video insertion and the modifications described hereinbefore, it should be noted that the adder ADD3 may be replaced by an intelligent switch. The intelligent switch, in effect, detects for each pixel in the processed block of prediction-error pixels RP, whether there is a non-zero pixel in the block of picture pixels M. That is, it detects whether an output pixel should be an inserted-video pixel. If so, the intelligent switch selects the output of the subtractor SUB to provide the output pixel. If not, the intelligent switch selects the relevant pixel of the block of prediction-error pixels R to provide the output pixel.

Finally, it should be noted that the prediction-error decoder PED in the MPEG-video modifier illustrated in FIG. 3, does not only provide blocks of prediction-error pixel R, but also blocks of picture pixels if the picture concerned has been I-type coded at the decoding end DE. In that case, the coding-error compensator CEC may be disabled. Furthermore, since the picture processor PP will process picture pixels rather than prediction-error pixels, the picture processing function F can, in principle, be carried out without introducing any distortion.

What is claimed is:

1. A method of modifying data (D), the data (D) having been coded so as to obtain coded data (CD), the method comprising the steps of:

partially decoding (PDEC) the coded data (CD) so as to obtain blocks of prediction-error pixels;

modifying (MOD) the blocks of prediction-error pixels so as to obtain modified partially decoded data (MPDD); and complementary coding (CCOD) the modified partially decoded data (MPDD), so as to obtain coded modified data (CMD).

2. A method of modifying data as claimed in claim 1, the method comprising the steps of:

fully decoding (PDEC,ADEC) a portion (%) of the coded data (CD) so as to obtain a piece of fully decoded data (PFDD);

deriving distortion-compensating data (DCD) from the piece of fully decoded data (PFDD);

adding the distortion-compensating data (DCD) to the modified partially decoded data (MPDD); and complementary coding (CCOD) the modified partially decoded data (MPDD) with the corrective data (CRD) added thereto, so as to obtain the coded modified data (CMD).

3. A data-modifying assembly for modifying data (D), the data (D) having been coded so as to obtain coded data (CD), the data-modifying assembly comprising:

a partial decoder (PDEC) for partially decoding the coded data (CD) so as to obtain blocks of prediction-error pixels;

a data modifier (MOD) for modifying the blocks of prediction-error pixels so as to obtain modified partially decoded data (MPDD); and a complementary coder (CCOD) for complementary coding the modified partially decoded data (MPDD), so as to obtain coded modified data (CMD).

* * * * *